United States Patent
Schoolcraft et al.

(10) Patent No.: US 6,466,333 B2
(45) Date of Patent: *Oct. 15, 2002

(54) STREAMLINED TETRAHEDRAL INTERPOLATION

(75) Inventors: Heidi M. Schoolcraft, San Jose, CA (US); Manish S. Kulkarni, Sunnyvale, CA (US); Moshe Broudo, Cupertino, CA (US)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/105,001

(22) Filed: Jun. 26, 1998

(65) Prior Publication Data

US 2001/0040686 A1 Nov. 15, 2001

(51) Int. Cl.$^7$ .............................. G03F 3/08; H04N 1/46
(52) U.S. Cl. ...................... 358/1.9; 358/522; 358/525
(58) Field of Search .......................... 358/525, 1.9, 524, 358/523, 522; 382/300, 167

(56) References Cited

U.S. PATENT DOCUMENTS

| | | | | |
|---|---|---|---|---|
| 4,275,413 A | * | 6/1981 | Sakamoto et al. | 358/80 |
| 4,346,402 A | | 8/1982 | Pugsley | 358/80 |
| 4,477,833 A | | 10/1984 | Clark et al. | 358/80 |
| 4,511,989 A | | 4/1985 | Sakamoto | 364/723 |
| 4,992,861 A | | 2/1991 | D'Errico | 358/75 |
| 5,390,035 A | | 2/1995 | Kasson et al. | 358/518 |
| 5,477,334 A | | 12/1995 | Keswani et al. | 356/405 |
| 5,479,272 A | | 12/1995 | Saito | 358/518 |

(List continued on next page.)

FOREIGN PATENT DOCUMENTS

EP 497466 8/1992

OTHER PUBLICATIONS

"Intel Architecture Software Developer's Manual, vol. 1: Basic Architecture", Intel Corporation, 1997, Chapters 3, 6 and 8.
"Intel Architecture Software Developer's Manual, vol. 2: Instruction Set Reference", Intel Corporation, 1997, Chapter 3, pp. 3–1, 3–13, 3–208 to 3–210, 3–306, 3–307, 3–425 and 3–426.
M. Schmit, "Pentium Processor Optimization Tools", Academic Press, Inc. 1995, Sections III and IV, pp. 102–192.

*Primary Examiner*—Thomas D. Lee
(74) *Attorney, Agent, or Firm*—Fitzpatrick Cella Harper & Scinto (57) ABSTRACT

A streamlined technique for obtaining interpolated color output values from corresponding color input values based on color output values stored in a color look-up table, with tetrahedral interpolation being applied so as to dissect each cubic grid of the color look-up table into plural tetrahedrons. According to the invention, processing efficiency is increased by avoiding the use of conditional branches when making a determination as to which of the plural dissected tetrahedrons a particular color input value falls. Preferably, rather than making such a determination, weights for all possible tetrahedrons for one cube are stored in a temporary look-up table, and an index into the temporary look-up table is calculated based on the magnitude of component values for each color input value. The index is calculated in a block of code that does not include conditional branches that are conditioned on the relative magnitude of the component values of the color input value. Most preferably, the block of code calculates the index through use of arithmetic operations, such as subtractions, which throw off a condition code that can be used to build the index into the temporary look-up table of weights. Because conditional branches are avoided, processing of such tetrahedral interpolation is speeded, particularly for processors such as a Pentium® processor that employ dual processor pipelines together with branch prediction.

32 Claims, 7 Drawing Sheets

U.S. PATENT DOCUMENTS

| | | | |
|---|---|---|---|
| 5,481,655 A | 1/1996 | Jacobs | 395/109 |
| 5,539,540 A | 7/1996 | Spaulding et al. | 358/518 |
| 5,581,376 A * | 12/1996 | Harrington | 358/518 |
| 5,583,666 A | 12/1996 | Ellson et al. | 358/518 |
| 5,596,510 A | 1/1997 | Boenke | 364/526 |
| 5,715,376 A * | 2/1998 | Nakayama | 395/109 |
| 6,040,926 A * | 3/2000 | Vondran, Jr. | 358/525 |
| 6,057,866 A * | 5/2000 | Haneda et al. | 347/118 |

* cited by examiner

STREAMLINED TETRAHEDRAL INTERPOLATION

BACKGROUND OF THE INVENTION

1. Field of the Invention

The present invention relates to tetrahedral interpolation by which an interpolated color output value is interpolated from values in a color look-up table based on a color input value. More particularly, the invention relates to tetrahedral interpolation that is streamlined so as to increase processing efficiency.

2. Description of the Related Art

Tetrahedral interpolation is a known technique by which color output values are obtained through interpolation of color values in a look-up table based on a color input value. One description of tetrahedral interpolation can be found in U.S. Pat. No. 4,275,413 to Sakamoto. According to the technique described there, a color look-up table is arranged into a cubic grid of color input values, with a color output value stored at each vertex of the cubic grid. A cube into which a desired color input value falls is dissected into plural tetrahedrons, and the particular tetrahedron into which the color input value falls is selected. Thereafter, interpolation is performed so as to obtain a color output value corresponding to the color input value based on a weighted sum of the values at the vertices of the dissected tetrahedron.

Interpolation so as to obtain a color output value based on a color input value is desirable because it improves color accuracy, and tetrahedral interpolation is desirable since it improves color smoothness between adjacent color values in adjacent cubes of the look-up table. At the same time, however, since interpolation must be performed for each pixel of a color image (or at least for each previously unprocessed color in a color image), the computational burden to perform tetrahedral interpolation is great.

The computational burden for tetrahedral interpolation is even greater for some computers since one of the steps required for tetrahedral interpolation is a determination as to which dissected tetrahedron a color input value falls. When programming a computer to perform such a determination, it is commonplace to use conditional branches by which the input coordinates of the color input value are compared against the coordinates of the vertices of the dissected tetrahedrons. Such conditional branches are expensive computationally, particularly when embodied in a device driver (such as a printer or a scanner driver) executing in a personal computer. Especially when the personal computer is powered by processors, like Pentium® or Pentium® clone processors, which employ dual processor pipelines together with branch prediction, there are significant processor cycle penalties for making unpredicted branches. Overall, these penalties slow the tetrahedral interpolation process to unacceptable levels. See generally Schmit, "Pentium Processor Optimization Tools", Academic Press, Inc., 1995, pp. 101–192.

Accordingly, even though tetrahedral interpolation is a desirable feature, it is often omitted when implementing print drivers because of the significant processor penalties associated with its implementation.

SUMMARY OF THE INVENTION

It is an object of the present invention to address the foregoing, by providing a streamlined technique for implementing tetrahedral interpolation, and particularly such a streamlined technique which does not involve conditional branches for determining which of plural dissected tetrahedrons a particular input color value falls.

Specifically, the invention is tetrahedral interpolation for use with a color look-up table which stores color output values at each vertex of a cubic grid of color input values, so as to obtain interpolated color output values for color input values. For each color input value, weights are calculated that depend on values of the color components that together constitute the color input value. The calculated weights are stored in a temporary look-up table that is accessible by an index. Thereafter, the index is calculated by executing a block of code that does not include conditional branches. The block of code calculates the index based on relative magnitude of the plural component values, and preferably is implemented by a block of code that calculates the index based on arithmetic calculations between the component values and not based on branches conditioned on comparisons between the component values. Finally, weights at the indexed location of the temporary look-up table are applied to color output values in the color look-up table so as to obtain the interpolated color output value.

By calculating the index with a block of code that does not include conditional branches, execution of the code is greatly speeded since there are no processor cycle penalties for making unpredicted branches. Accordingly, efficient use of processors is achieved, particularly for processors that involve dual processor pipelines together with branch prediction.

In one preferred embodiment of the invention, the block of code by which indexes are calculated involves the use of arithmetic operations, such as subtractions, which automatically set a condition code based on the outcome of the arithmetic operation. For example, the assembly language command set of a Pentium® processor includes a "sub" command which sets a condition code and the condition code which can be used to determine whether the resultant difference is equal to zero, above zero, or both. Again referring to the Pentium® assembly language command set, the command "setae" sets a register if the condition code indicates that a previous subtraction result was above or equal to zero, and the command "seta" sets a register if previous subtraction result was above zero. The preferred embodiment of the invention uses such set commands so as to construct the index needed to index into the temporary look-up table of weights, all in a block of code that does not include conditional branches.

Use of such arithmetic commands results in an additional benefit that the results of subtractions can also be used in other operations needed for tetrahedral interpolation. In other embodiments, the index is calculated using bit shift commands or masking commands.

The steps of calculating the plural weights, storing the calculated weights, executing the block of code, and applying the weights preferably are repeated for each pixel of an input image, or at least each previously unprocessed color in the input image, so as to derive color output values for each pixel for printout by a printer.

In another aspect, the invention is a method for obtaining plural output color component values from plural input color component values using tetrahedral interpolation. The plural input color component values represent an input color in an input color format. The plural output color component values represent an output color in an output color format. The method is based on a cubic grid, with each axis of the cubic grid corresponding to a type of input color component, and each vertex of the cubic grid corresponds to plural output color component value entries. An entry in the cubic grid is determined that corresponds to a vertex of a cube which includes the input color. Plural weights are calculated based on distances of the plural input color component values from at least one vertex of the cube. The plural weights are stored in a look-up table accessible by an index that indicates which tetrahedron of the cube corresponds to the plural input color component values. The index is calculated and is used to calculate weights in the look-up table. The plural output color component values are obtained by applying the accessed plural weights to the plural output color component value entries corresponding to vertices that form the indicated tetrahedron of the cube. In the method, the index is calculated in a block of code consisting of assembler instructions, all of which are performed regardless of relative values of the input color component values.

In the preferred embodiment, fixed blocks of assembler instructions are also used to calculate the plural weights, store the plural weights, access the plural weights and apply the accessed plural weights. All of the assembler instructions in the fixed sets are performed regardless of relative values of the input color component values.

The steps of calculating the plural weights, storing the plural weights, calculating the index, accessing the plural weights and applying the accessed plural weights preferably are repeated for each pixel of an input image, or at least each previously unprocessed color in the input image, so as to derive color output values for each pixel for printout by a printer.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

Figure 1:
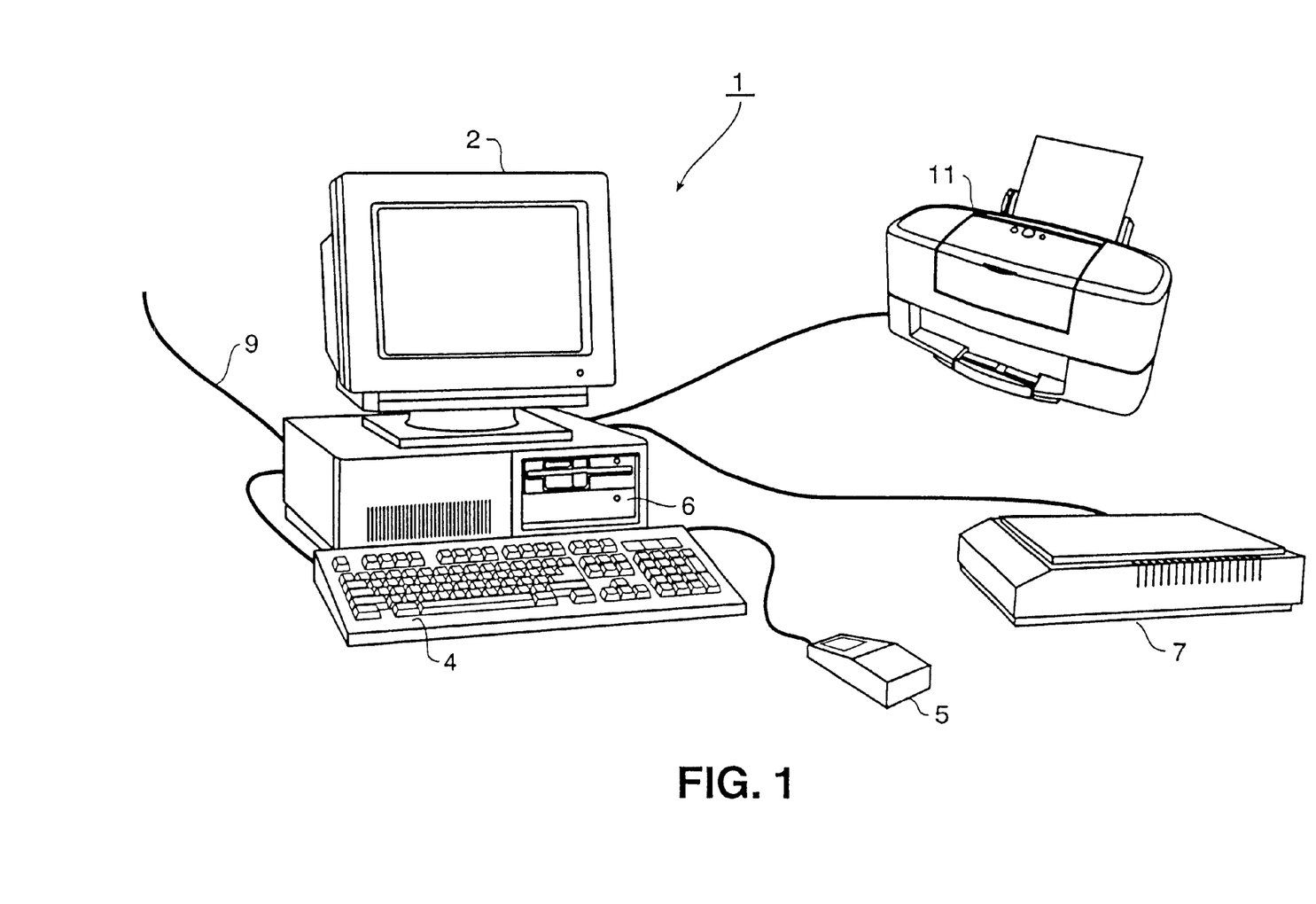
FIG. 1 is a representational view of a computer system in which the present invention may be utilized.

FIG. 1 is a representational view of a computer system in which the present invention may be utilized. Computer system 1 may be a Macintosh, PC-compatible, or other type of system having an operating system which preferably is a windowing operating system, such as Microsoft® Windows, but which may also be a non-windowing system such as DOS or UNIX. In the preferred embodiment, computer system 1 is a Pentium®-based computer system.

Provided with computer system 1 are display 2 which may be a color monitor, keyboard 4 for entering user commands, and pointing device 5 such as a mouse for pointing to and for manipulating graphical user interfaces and other objects displayed on display 2.

Computer system 1 also includes a mass storage device such as fixed disk 6 for storing computer executable process steps for image processing applications, other applications, printer driver, other device drivers and the like. Such storage may also be provided by a CD-ROM (not shown).

Scanner 7 is an image acquisition device that may be used to scan documents so as to provide images to computer system 1. Such images are typically input to scanner 7 in an illuminative (e.g., red-green-blue or RGB) color format. Of course, images may be input into computer system 1 using other image acquisition devices, such as a digital camera or the like. Images also may be input into computer system 1 from a variety of other sources, such as from a Local Area Network or the World Wide Web through network interface 9.

Printer 11 is provided for outputting processed images. Images typically are output to printer 11 in an absorptive (e.g., cyan-magenta-yellow or CMY) color format. Of course, images may be output from computer system 1 to other devices. Images also may be output from computer system 1 to a variety of other destinations, such as to a Local Area Network or the World Wide Web through network interface 9.

It should be understood that, although a programmable general purpose computer is shown in FIG. 1, a dedicated computer terminal or other type of data processing equipment can utilize the present invention.

Figure 2:
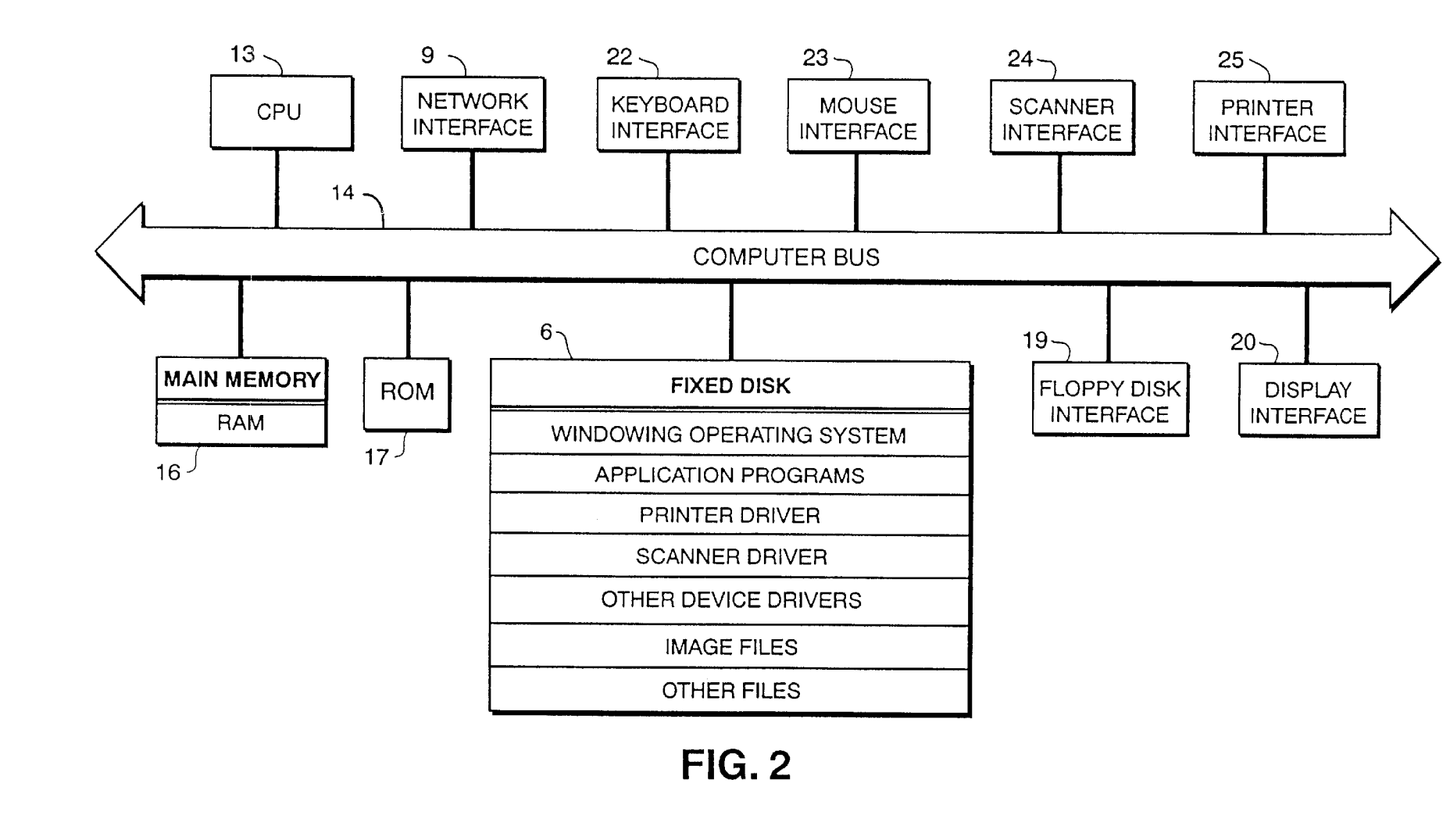
FIG. 2 is a detailed block diagram showing the internal architecture of the computer system of FIG. 1.

FIG. 2 is a detailed block diagram showing the internal architecture of computer system 1. As shown in FIG. 2, computer system 1 includes central processing unit (CPU) 13 which interfaces with computer bus 14. Also interfacing with computer bus 14 are fixed disk 6, network interface 9, main memory (RAM) 16, read only memory (ROM) 17, floppy disk interface 19, display interface 20 to display 2, keyboard interface 22 to keyboard 4, mouse interface 23 to pointing device 5, scanner interface 24 to scanner 7, and printer interface 25 to printer 11.

CPU 13 preferably employs multiple processor pipelines, together with branch prediction, for enhanced processing speed. A Pentium® processor or future-developed processor is preferred. In addition, it is preferred for the processor to support extended arithmetic operations, such as MMX technology.

Main memory 16 interfaces with computer bus 14 so as to provide RAM storage to CPU 13 during execution of software applications. More specifically, CPU 13 loads process steps from fixed disk 6, another storage device, or some other source such as a network, into main memory 16. CPU 13 then executes the stored process steps from main memory 16 in order to execute applications. Data such as source and destination images can be stored in main memory 16, where the data can be accessed by CPU 13 during execution of the process steps.

As also shown in FIG. 2, fixed disk 6 typically contains an operating system, application programs such as image processing applications, device drivers including a printer driver and a scanner driver, image files and other files.

Although the preferred embodiment implements the invention in a printer driver that performs tetrahedral interpolation, the invention can be implemented in numerous other ways. For example, the invention can be embodied in stand-alone code, such as for transforming images from an illuminative color format such as RGB to an absorptive color format such as CMY or CMYK, or vice versa. In this embodiment, the tetrahedral interpolation code can form a separate application program. Alternatively, the interpolation can be part of a scanner driver or another application program. In other embodiments, code that performs the tetrahedral interpolation can be included in dynamically-linked libraries for use by other drivers and applications. It will be understood by those skilled in the art that a great many other possible embodiments of the invention exist, and the foregoing is not an exclusive list of such embodiments.

In the preferred embodiment described herein, the invention is described with respect to transforming image data from a RGB color format to a CMY color format. However, the invention is equally applicable to transforming an image to a CMYK color format. In a broader sense, the invention can be utilized in any situation involving interpolation from one multidimensional coordinate system to another multi-dimensional coordinate system, such as from absorptive to reflective colors, reflective to absorptive, device independent to device dependent, and device dependent to device independent.

Figure 3:
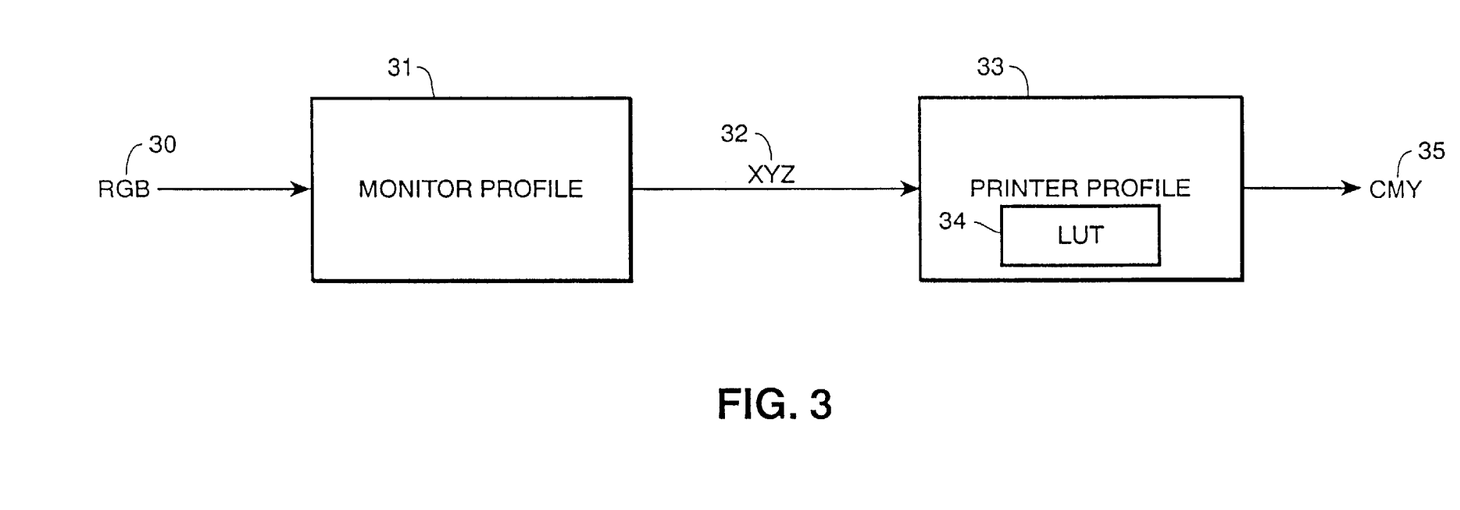
FIG. 3 is a view schematically showing transformation of an input RGB color to an output CMY color.

FIG. 3 is a view schematically showing transformation of input RGB color 30 to output CMY color 35. These colors are for pixels of an input image and an output image, respectively. The RBG color is represented in a format for use by a display, and the CMY color is represented in a format for use by a printer.

In FIG. 3, RGB color 30 is represented in an illuminative color format for use by a display such as display 2. In an illuminative format, a color is represented by color component separation values. These separation values represent relative strengths of light that combine so as to appear to form the desired color.

For example, in the RGB system, the component values represent relative strengths of red, green and blue light that combine so as to appear to form the desired color. These values can be used by a display system that generates red, green and blue light to display the color. In order to provide an image with colors that more closely approximate desired colors, the component values of RGB color 30 are selected to adjust for the particular characteristics of display 2.

In FIG. 3, RGB color 30 enters monitor profile correction element 31, which corrects the color component values of RGB color 30 in order to generate "true" or unadjusted color separation values. These true color separation values form XYZ color 32, which is output from monitor profile correction element 31. XYZ color 32 is still in an illuminative color format, which preferably is the same format as RGB color 30.

XYZ color 32 enters printer profile 33. Because printers operate by ejecting color-absorbing ink, XYZ color 32 must be transformed into a absorptive color format such as CMY or CMYK before the color can be output by a printer. Look-up table (LUT) 34 is used to perform this transformation.

While FIG. 3 shows transformation of a single color from RGB to CMY format, such a transformation can be applied to all pixels of an entire input image, in stages. Thus, all pixels of an input image can be transformed from a RGB color format to a XYZ color format. Then, all pixels of the XYZ color image can be transformed into CMY colors.

Figure 4:
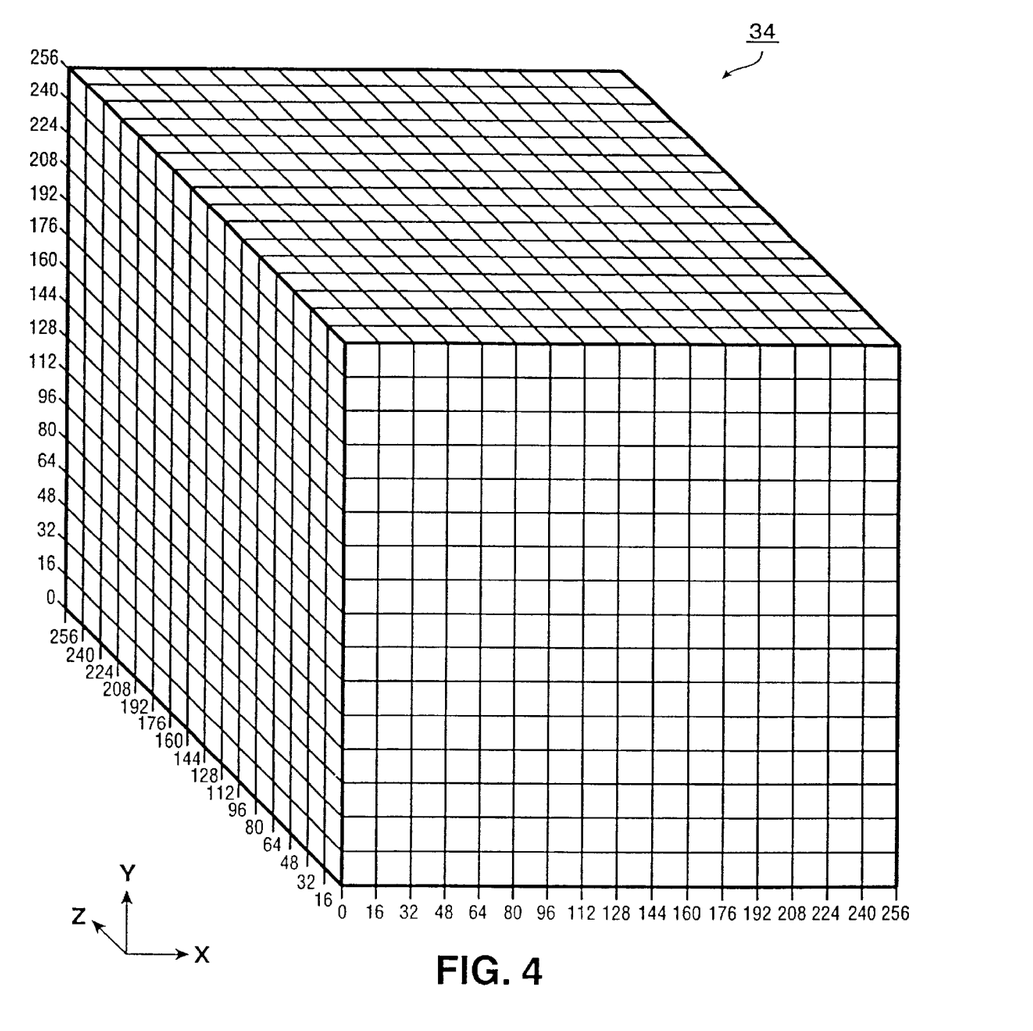
FIG. 4 is an illustrative view of a look-up table arranged in the form of a three dimensional matrix.

FIG. 4 is an illustrative view of look-up table 34, which in this case is arranged in the form of a three dimensional matrix. Each axis of the matrix corresponds to an input color component. In the preferred embodiment, values for these color components span a range of 0 to 255, although values are not provided at each point between 0 and 255.

Each entry in look-up table 34 is identified by a specific combination of input color component values and stores a corresponding combination of output color component values. Assuming that each input and output color has three color components and each component value takes one (1) byte to store, roughly forty-eight (48) megabytes of data would be required to store all of the color component value entries if entries were stored for each point in the table. While storing and accessing a table of this size is possible, such a use of memory is unacceptably wasteful. As a result, output color component values are stored as entries in look-up table 34 only sparsely, for some input color component values.

The numbers along each axis of look-up table 34 in FIG. 4 illustrate that output color component values are stored only for approximately every sixteenth input component value. Therefore, the table has 17×17×17 entries, each of which stores a set of output color component values. In alternative embodiments, a different interval such as eight (8) or thirty-two (32) is used between entries in the table.

Figure 5:
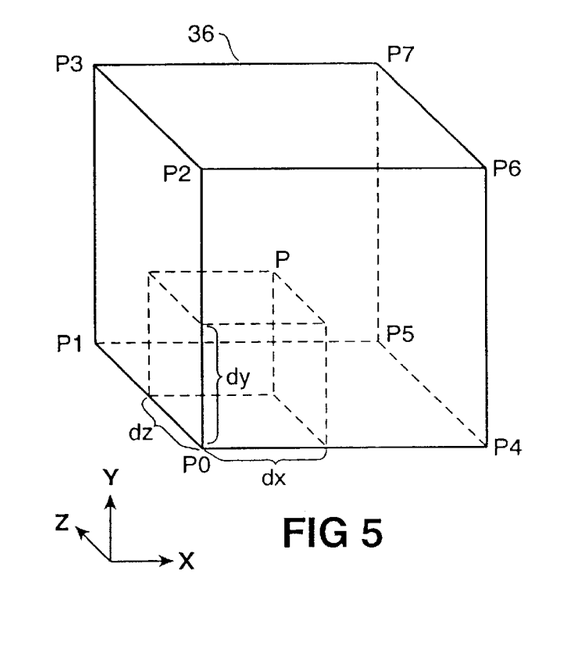
FIG. 5 is an view illustrating a cube formed by vertices representing input color component values that correspond to an entry in the look-up table of FIG. 4.

Look-up table 34 can be viewed as a cubic grid, with each cube formed by vertices representing input color component values that correspond to an entry in the table. FIG. 5 illustrates such a cube. Each of points P0 through P7 of cube 36 represents a set of input color component values corresponding to an entry in look-up table 34, and therefore, to a stored set of output color component values. For example, if the input color at point P has color component values Xi=86, Yi=119 and Zi=152, then P0 through P7 are given as shown in Table I.

TABLE I

P0 through P7 for input color with Xi = 86, Yi = 119 and Zi = 152.

| Point | (Xi, Yi, Zi) |
| --- | --- |
| P0 | (80,112,144) |
| P1 | (80,112,160) |
| P2 | (80,128,144) |
| P3 | (80,128,160) |
| P4 | (96,112,144) |
| P5 | (96,112,160) |
| P6 | (96,128,144) |
| P7 | (96,128,160) |

In the case that an input color has input color component values that fall between entries in look-up table 34, output color component values must be interpolated from some or all of the entries corresponding to points P0 through P7.

FIG. 5 also illustrates distances used by the invention to perform this interpolation. Values dx, dy and dz represent the distances of the input color component values at point P from point P0. For the example shown above in Table I, dx–6, dy=7 and dz=8.

These distance values can be calculated arithmetically. However, in order to improve processing speed, a look-up table of distances preferably is used. In the preferred embodiment, this look-up table of distances has 256 entries representing the 256 possible input color component values. The entries of the table count from 0 to 15 and then repeat, with a number skipped at any one of the entries so than an input color component value of 255 results in an output value of 16. As a result, a maximum input color component value of 255 corresponds to an entry with a value of 256 on an axis of look-up table 34. The values of the distances look-up table are shown in Table II.

TABLE II

Distances Look-Up Table.

| Input value | Output distance |
|---|---|
| 0 | 0 |
| 1 | 1 |
| ... | ... |
| 15 | 15 |
| 16 | 0 |
| ... | ... |
| 248 | 8 |
| 249 | 10 |
| 250 | 11 |
| ... | ... |
| 255 | 16 |

Of course, if the interval between input color component values on each axis of look-up table 34 is different then sixteen (16), the distances look-up table is adjusted accordingly.

Once the distances of the input color components from P0 are calculated, tetrahedral interpolation is used to determine output color component values. This type of interpolation produces acceptable smoothness between output colors. In tetrahedral interpolation, cube 36 is divided into a plurality of tetrahedrons. Based on which tetrahedron contains the input color component values, a formula is selected for determining the output color component values.

Figure 6:
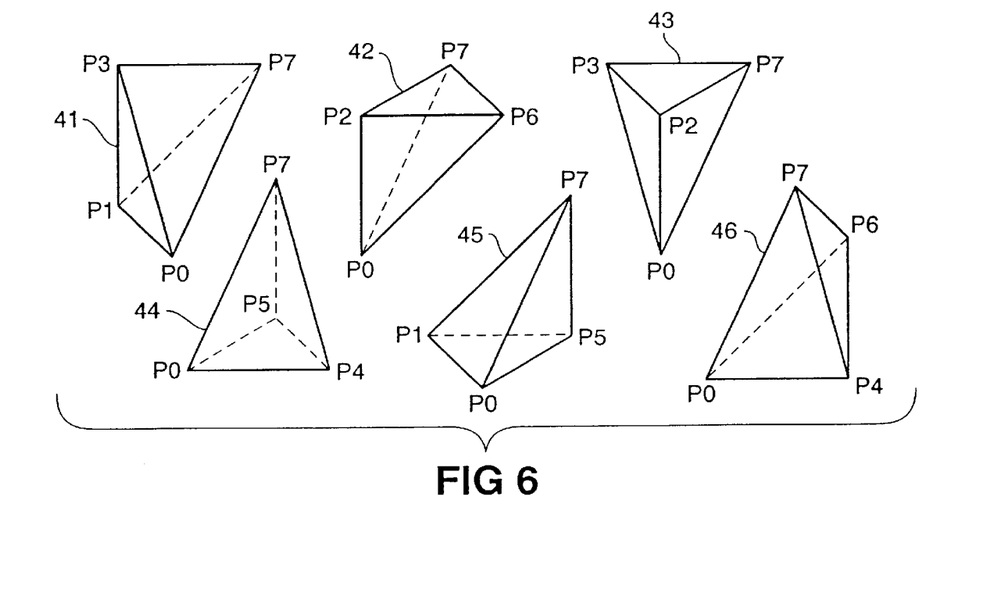
FIG. 6 is a view illustrating six tetrahedrons that are used in one type of tetrahedral interpolation.

FIG. 6 illustrates six tetrahedrons that are used in one type of tetrahedral interpolation. Tetrahedrons 41 through 46 divide cube 36 into six regions. All six of the tetrahedron share points P0 and P7. output color component values are interpolated from the points forming the tetrahedron into which the input color component values fall. For example, if the input color component values fall in tetrahedron 45, output color component values are interpolated from entries in look-up table 34 corresponding to points P0, P1, P5 and P7.

The output color component values are calculated by weighting the entries in look-up table 34 that correspond to the appropriate tetrahedron by the distances of the input color component values from the vertices of the tetrahedron. In conventional systems, conditional statements that test the input color component values are used to select an interpolation equation that performs this weighting. The conditional statements and the corresponding equations are shown in Table III. In the table, V represents an output color component value (e.g., C, M or Y value) at point P, and V0 through V7 represent the corresponding entry (e.g., C, M or Y value) in look-up table 34 for points P0 through P7. In addition, the interval between input color component values for look-up table 34 is assumed to be 16.

TABLE III

Conditional statements and corresponding equations for tetrahedral interpolation.

| Conditional Statement | Interpolation Equation |
|---|---|
| if dz ≧ dy > dx (P is in tetrahedron 41) then | V = [(dx)V0 + (dy − dx)V3 + (dz − dy)V1 + (16 − dz)V7]/16 |
| if dy > dx > dz (P is in tetrahedron 42) then | V = [(dz)V0 + (dx − dz)V6 + (dy − dx)V2 + (16 − dy)V7]/16 |
| if dy > dz ≧ dx (P is in tetrahedron 43) then | V = [(dx)V0 + (dz − dx)V3 + (dy − dz)V2 + (16 − dy)V7]/16 |
| if dx ≧ dz > dy (P is in tetrahedron 44) then | V = [(dy)V0 + (dz − dy)V5 + (dx − dz)V4 + (16 − dx)V7]/16 |
| if dz > dx ≧ dy (P is in tetrahedron 45) then | V = [(dy)V0 + (dx − dy)V5 + (dz − dx)V1 + (16 − dz)V7]/16 |
| if dx ≧ dy ≧ dz (P is in tetrahedron 46) then | V =[(dz)V0 + (dy − dz)V6 + (dx − dy)V4 + (16 − dx)V7]/16 |

Particularly with modern microprocessors, a large processing speed penalty is associated with these conditional statements. When all pixels of an image are processed, the accumulated penalty for the entire image typically rises to unacceptable levels.

The present invention addresses the foregoing problem by performing tetrahedral interpolation without the use of conditional statements to select an interpolation equation. Instead, a temporary look-up table of weights is constructed from the input color component values, an index to the table is calculated, and weights in the temporary look-up table are accessed using the index. The accessed weights are then applied to the output color component values for the vertices of the appropriate tetrahedron in look-up table 34, thereby interpolating the component values of the output color.

In the preferred embodiment, several more tables are used in performing the foregoing operations. One table is an offset table that relates a given index to output color component values for vertices of a corresponding tetrahedron.

Another table is a temporary look-up table that relates a given index to weights constructed from dx, dy and dz for each input color. These two tables are explained in more detail below.

Because look-up table 34 is actually stored in a linearly-organized memory such as main memory 16, an offset table is useful in accessing the output color component values for the vertices of the tetrahedrons. In the preferred embodiment, this offset table stores offsets between output color component values for a given point P0 and the corresponding output color component values for the points forming the vertices of the six tetrahedrons is shown in FIG. 6. The table is accessible by an index, with an index of 1 referring to tetrahedron 41, an index of 2 referring to tetrahedron 42, et cetera. For convenience, an index of 0 refers to the offset for point P7. Because each tetrahedron includes points P0 and P7, offsets for only two other points are needed for each tetrahedron. These two offsets are referred to as OffPtB and OffPtC. Entries for this offset table are shown in Table IV, along with the reference numeral of the corresponding tetrahedron from FIG. 6.

TABLE IV

Offset table relating an index to OffPtB and OffPtC.

| Index | Tetrahedron | OffPtB | OffPtC |
| --- | --- | --- | --- |
| 0 | n/a (P7) | Offset to P7 | Offset to P7 |
| 1 | 41 | Offset to P3 | Offset to P1 |
| 2 | 42 | Offset to P6 | Off set to P2 |
| 3 | 43 | Offset to P3 | of f set to P2 |
| 4 | 44 | Offset to P5 | Offset to P4 |
| 5 | 45 | Offset to P5 | Offset to P1 |
| 6 | 46 | Offset to P6 | Offset to P4 |

For a given input color (i.e., a given set of input color component values), a temporary look-up table of weights is constructed from dx, dy and dz. The temporary look-up table is constructed so that the appropriate weights for tetrahedral interpolation of output color component values can be accessed with a given index. The entries of this table are shown in Table V. In the table, "step" refers to the interval between input color component values on each axis of look-up table 34. "step" has a value of sixteen (16) for the look-up table illustrated in FIG. 4.

TABLE V

Temporary look-up table for weighting output color component values.

| Index | diffN | subB | subC | grdfN |
| --- | --- | --- | --- | --- |
| 1 | dx | dy–dx | dz–dy | step–dz |
| 2 | dz | dx–dz | dy–dx | step–dy |
| 3 | dx | dz–dx | dy–dz | step–dy |
| 4 | dy | dz–dy | dx–dz | step–dx |
| 5 | dy | dx–dy | dz–dx | step–dz |
| 6 | dz | dy–dz | dx–dy | step–dx |

Figure 7:
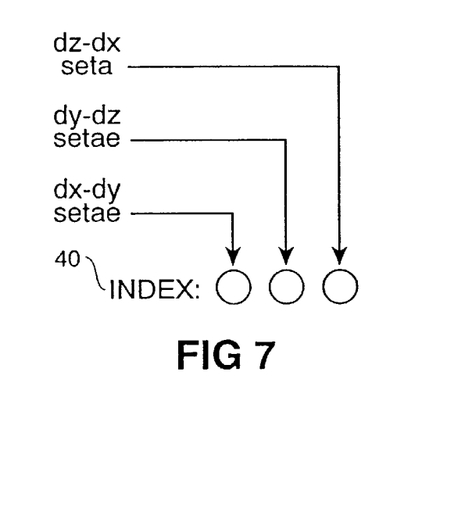
FIG. 7 is a view illustrating construction of an index used to access an offset table and a temporary look-up table for a given input color according to one embodiment of the invention.

FIG. 7 illustrates construction of index 40 used to access the offset table and the temporary look-up table for a given input color according to one embodiment of the invention. The circles in FIG. 7 represent bits of index 40. The term "seta" refers to an assembler instruction that looks to a condition code so as to return a value of 1 if a result of a preceding arithmetic operation (e.g., a substraction) is above zero. Similarly, the term "setae" refers to an assembler instruction that returns a value of 1 if a result of a preceding arithmetic operation is above or equal to zero. For example, if dy-dx is greater than 0, dy-dz is less than 0, and dz-dx is greater than 0, then index 40 has a value of 5 (binary 101). Sample code that implements this method of constructing the index is given in Appendix A.

Other methods of constructing the index exist. For example, in another embodiment of the invention, the results of the subtractions shown in FIG. 7 are shifted right until only sign bits remain. The sign bits are then used to construct the index.

In yet another embodiment, a logical AND operation is used to apply a mask to the results of the subtractions shown in FIG. 7, stripping off all bits except for the sign bits. These masked results are then used to construct the index.

One common feature of all of these methods of constructing the index is that none of the methods use conditional branch statements. Thus, the large processing speed penalties associated with such conditional branch statements are largely avoided.

Once the index has been constructed, the index is used with the offset table to access the appropriate color component values. The index also is used with the temporary look-up table to access the appropriate weights for a given input color (i.e., set of input color component values). The output color component values can then be calculated using the following equation (1);

$$InterpOut=\{difN[i]*(locP0+OffPtB[0])+subB[i]*(locP0+OffPtB[i])+subC[i]*(locP0+OffPtC[i])+grdfN[i]*(locP0)\}+step \quad (1)$$

where InterpOut is the interpolated output; i is the index; difN, subB, subC and grdfN are weights from the temporary look-up table; locP0 is the memory location in look-up table 34 for a color component at point P0 of the cube (tetrahedron) that contains the input color; OffPtB and OffPtC are offsets retrieved from the offset table; and parenthesis indicate that the value stored at the parenthesized memory location is used. As a result of the construction of the tables and the selection of the index, the difN, subB, subC and grdfN values are the weights for the interpolation, and the values stored at the memory locations enclosed by parenthesis are the color component values for the vertices of the appropriate tetrahedron.

Equation (1) is used for each of the output color component values. In order to interpolate a particular output color component value, locP0 is selected so that is points to the corresponding output color component value entry in look-up table 34 for point P0. For example, assume that the output color components are CMY color components. Then, in order to interpolate an output C (cyan) color component value, locP0 is set to point to the C color component value entry for point P0 in look-up table 34, and equation (1) is applied a first time. Next, in order to interpolate an output M (magenta) color component value, locP0 is adjusted to point to the M color component value entry for point P0, and equation (1) is applied a second time. Then, in order to interpolate an output Y (yellow) color component value, locP0 is adjusted to point to the Y color component value entry for point P0, and equation (1) is applied a third time. In the preferred embodiment, this adjustment of locP0 is performed by incrementing locP0.

In some modern microprocessors such as the Pentium®, multiplication operations are costly in terms of processing time. If the invention is used with one of these microprocessors, a multiplication look-up table preferably is used to perform the multiplications for equation (1), in order to further increase processing efficiency. This multiplication table does not use an inordinate amount of memory because all of the weights in equation (1) range from 0 to 16, and all of the color component values range from 0 to 255. Therefore, the table only occupies approximately 4 k of memory. These ranges will differ, of course, depending on the selected interval (step) and range of color component values in look-up table 34.

In some microprocessors such as the Pentium® with MMX™ technology, multiple multiplications can be performed extremely quickly using specialized functions. If the invention is used with one of these microprocessors, the specialized functions are utilized to perform the multiplications for equation (1). For example, MMX technology allows four (16-bit) multiplications to be performed simultaneously in a single instruction, thereby allowing all of the sixteen multiplication for interpolation equation (1) for up to four (4) color component values in only 4 cycles.

In order to further increase speed, dividing by "step" preferably is performed with bit shift operations.

A system for using the foregoing tables, index and equation to transform a color image from an input color format to an output color format is explained hereinafter with respect to FIGS. 8 and 9.

Briefly, the interpolation of the invention is based on a color look-up table which stores color output values of each vertex of a cubic grid of color input values. Plural weights are calculated for the color input value. Each of the plural weights depends on color component values that together constitute the color input value, and each of the weights corresponds to respective ones of plural tetrahedrons into which each cube of the cubic grid is dissected. The calculated weights are stored in a temporary look-up table accessible by an index. A block of code is executed to calculate the index. The block of code does not include conditional branch instructions conditioned on a comparison of the plural component values of the color input value. Instead, the index is based on relative magnitude of the component values of the color input value. The weights at the indexed location of the temporary look-up table are applied to the color output values in the color look-up table so as to obtain an interpolated color output value corresponding to the color input value.

Figure 8:
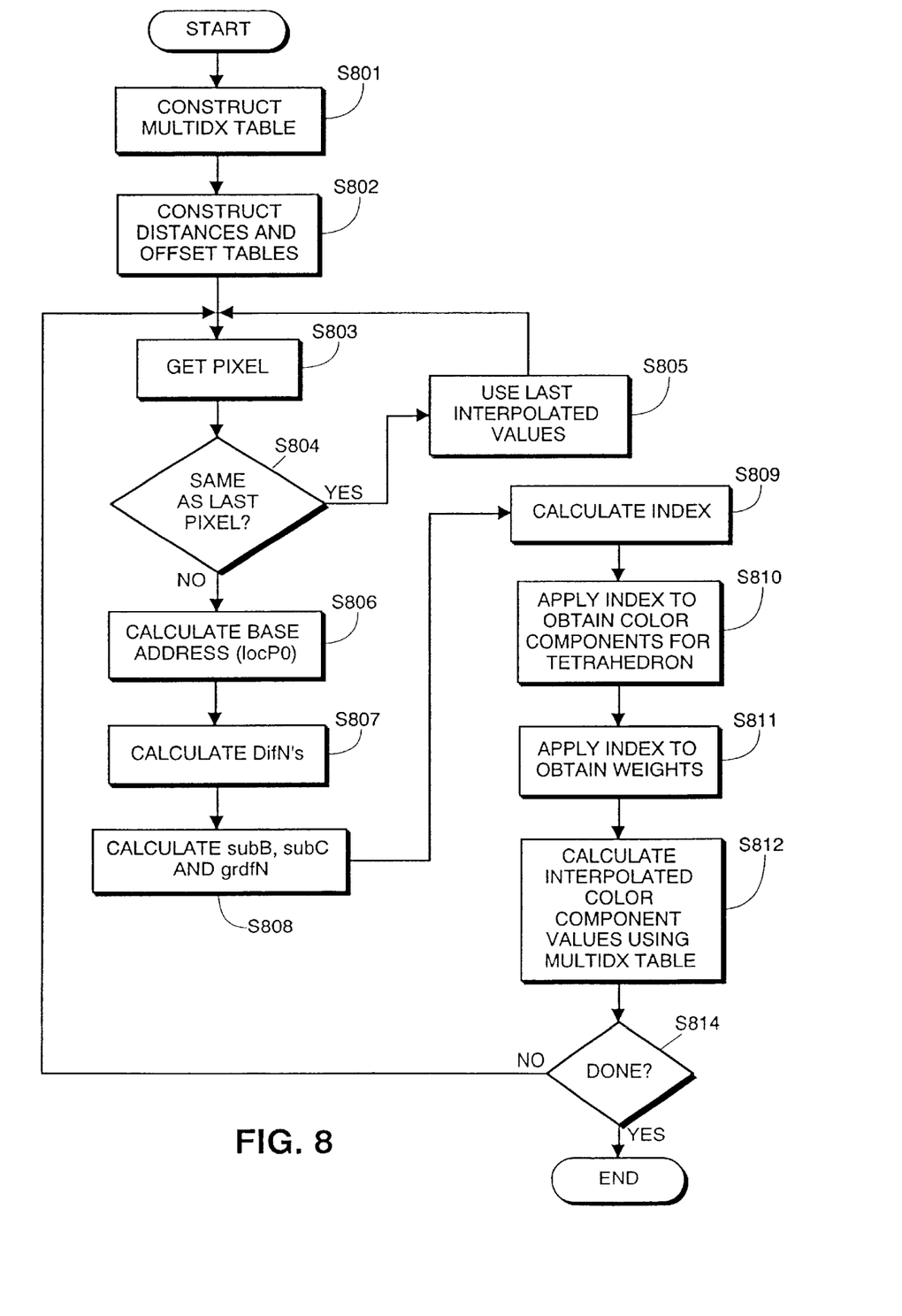
FIGS. 8 and 9 are flowcharts for explaining tetrahedral interpolation according to the invention to obtain output color values corresponding to an input image using a color look-up table.

FIG. 8 is a flowchart for explaining tetrahedral interpolation according to the invention to obtain output color values corresponding to an input image using a color look-up table. The embodiment illustrated in FIG. 8 preferably is performed using a microprocessor that incurs significant processing time penalties for multiplications.

In step S801, multiplication table MultIdx is generated. This multiplication table includes entries for multiplying all possible interpolation weights by all possible output color component values. In the example discussed above with reference to FIG. 7, this look-up table includes entries for weights ranging from 0 to 16 and for color component values ranging from 0 to 255.

The distances table, illustrated in Table II above, and the offset table, illustrated in Table IV above, are constructed in step S802. These tables preferably are generated once, when the method is initialized.

In step S803, a pixel of the input image is retrieved. The pixel is in an input color format and has a plurality of input color component values associated therewith. For example, if the pixel is in an XYZ color format (i.e., true color separation), the pixel has three input color component values: Xi, Yi and Zi.

It is determined in step S804 if the retrieved pixel is the same as a last retrieved pixel. If the retrieved pixel is the same as the last retrieved pixel, flow proceeds to step S805, where the previously-interpolated output color component values are returned. Flow then returns to step S803 for the next pixel. If the retrieved pixel is not the same as the last retrieved pixel, flow proceeds to step S806. Steps S804 and S805 improve processing speed by reducing redundant interpolations.

Base address locP0 is determined in step S806 for an entry in look-up table 34 that stores a color component value for vertex P0 of a cube containing the input color. Using the example described above with respect to Table I, if the input color has component values Xi=86, Yi=119 and Zi=152, then locP0 is the memory location in look-up table 34 corresponding to X=80, Y=112 and Z=144.

In step S807, the difN column of the temporary look-up table is constructed. The difN entries (i.e., dx, dy and dz) preferably are calculated from the input color component values using the distances table generated in step S802. For example, dx is retrieved from the Xi entry in the distances table, dy is retrieved from the Yi entry, and dz is retrieved from the Zi entry.

Entries for the rest of the temporary look-up table are constructed in step S808. These entries are weights used in the interpolation process and include entries for columns subB, subC and grdfN. In the preferred embodiment, these entries are calculated arithmetically from dx, dy and dz, as shown in Table V above. In other embodiments, such as embodiments that perform different types of interpolation, different methods can be used to calculate these entries.

In step S809, an index is calculated. Methods of calculating the index are explained above with reference to FIG. 7. These methods include using specialized assembler instructions, using logical instruction and using masking instructions. All of these methods calculate the index without using conditional branch instructions, and in particular without using conditional branch instructions conditioned on a comparison of the input color component values.

In the preferred embodiment, the instructions used to calculate the index consist of a fixed set of assembler instruction, all of which are performed regardless of relative values of the input color component values. An example of such a set of assembler instructions according to the preferred embodiment is given in Appendix A.

The index is applied in step S810 to the temporary offset table to obtain offsets from locP0 in look-up table 34 for color component values of the vertices of the tetrahedron corresponding to the index. The index is applied in step S811 to the temporary look-up table to obtain the weights for the interpolation.

In step S812, the offsets and weights calculated in steps S810 and S811 are used in equation (1) to obtain the interpolated output color component values. In the preferred embodiment, equation (1) is calculated once for each output color component value. For example, if the output color format is a CMY format with three color component values, equation (1) is calculated three times. If the output color format is a CMYK format with four color component values, equation (1) is calculated four times. Between each calculation, locP0 is adjusted to point to the entry in look-up table 34 corresponding to the appropriate type of color component value for point P0 of the cube containing the input color. In the preferred embodiment, this adjustment is performed by an increment command between each calculation.

As mentioned above, the embodiment shown in FIG. 8 is for a processor that suffers significant processing speed penalties for performing multiplication instructions. Therefore, the multiplications for equation (1) are performed using the MultIdx table constructed in step S801.

While steps S807 through S812 are shown as distinct steps in FIG. 8, the instructions that perform these steps in the preferred embodiment are interleaved so as to reduce redundant instruction.

In other words, steps S807 through S812 occur coextensively. For example, arithmetic operations such as subtractions preferably are performed in step S808 to calculate entries for the temporary look-up table. "Seta" and "setae" commands are used after some of these subtractions to calculate the index in step S807.

Preferably, steps S806 through S812 are each performed by a fixed set of assembler instructions, all of which are executed regardless of the input color component value values. As a result, interleaving the steps advantageously is simplified. The interleaving of steps S808 and S809 is illustrated in the sample code given in Appendix A.

In step S814, it is determined if all of the pixels of the input image have been interpolated. If not, flow returns to step S803, and the next pixel is processed.

Figure 9:
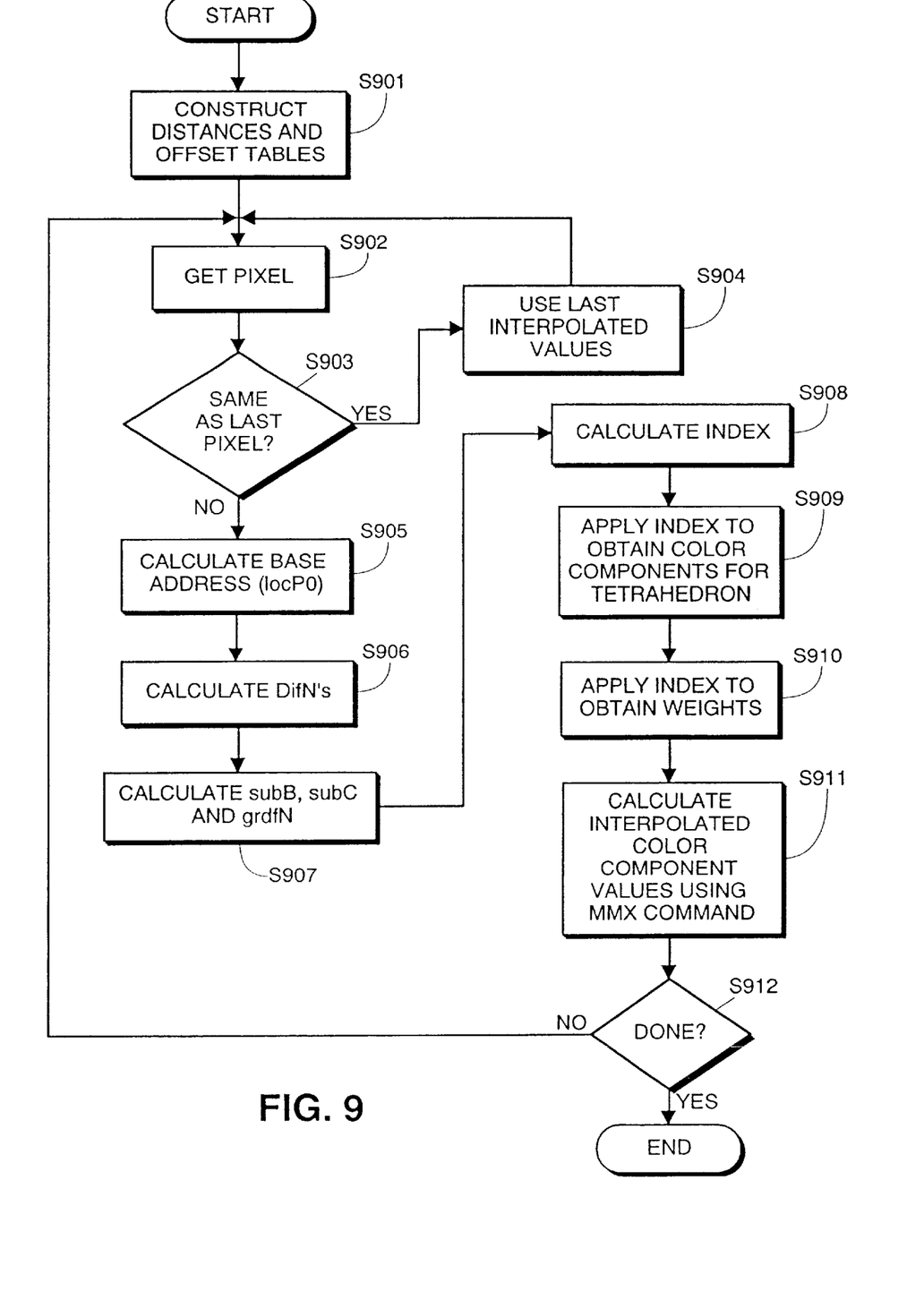

FIG. 9 is a flowchart for explaining tetrahedral interpolation according to another embodiment of the invention. The embodiment illustrated in FIG. 9 preferably is performed using a microprocessor that has specialized instructions for performing multiplication such as a Pentium® with MMX™ technology. For the sake of brevity, the explanations of steps in FIG. 9 that are similar to steps in FIG. 8 are abbreviated.

The distances table, illustrated in Table II above, and the offset table, illustrated in Table IV above, are constructed in step S901. These tables preferably are generated once, when the method is initialized.

In step S902, a pixel of the input image is retrieved. It is determined in step S903 if the retrieved pixel is the same as a last retrieved pixel. If the retrieved pixel is the same as the last retrieved pixel, flow proceeds to step S904, where the previously-interpolated output color component values are returned. Flow then returns to step S902 for the next pixel. If the retrieved pixel is not the same as the last retrieved pixel, flow proceeds to step S905.

Base address locP0 is determined in step S905 for an entry in look-up table 34 that stores a color component value for vertex P0 of a cube containing the input color.

In step S906, the difN column of the temporary look-up table is constructed. The difN entries (i.e., dx, dy and dz) preferably are calculated from the input color component values using the distances table generated in step S901.

Entries for the rest of the temporary look-up table are constructed in step S907. These entries are weights used in the interpolation process and include entries for columns subB, subC and grdfN. In the preferred embodiment, these entries are calculated arithmetically from dx, dy and dz, as shown in Table V above.

In step S908, an index is calculated. The index is calculated without using conditional branch instructions, and in particular without using conditional branch instructions conditioned on a comparison of the input color component values. In the preferred embodiment, the instructions used to calculate the index consist of a fixed set of assembler instruction, all of which are performed regardless of relative values of the input color component values.

The index is applied in step S909 to the temporary offset table to obtain offsets from locP0 in look-up table 34 for color component values of the vertices of the tetrahedron corresponding to the index. The index is applied in step S910 to the temporary look-up table to obtain the weights for the interpolation.

In step S911, the offsets and weights calculated in steps S909 and S910 are used in equation (1) to obtain the interpolated output color component values. In the preferred embodiment, equation (1) is calculated using the specialized instructions available for the microprocessor. For example, in the case of an MMX™ enabled processor, all of the multiplications for all output color component values are calculated in 4 cycles.

MMX register settings in a case of a CMY output color format are shown in Table VI. In this table, locP0[x] represents a memory location of an x color component value for point P0. For example, locP0[C] represents a memory location of a cyan color component value for point P0. The term "entry at" means the value of the entry of look-up table 34 at the specified location in main memory 16. For example, "entry at locP0[Y]+OffPtB[0]" means the value for the entry at the location in look-up table 34 offset OffPtB[0] bytes from locP0[Y].

TABLE VI

MMX register settings for output color format with CMY color components.

| MMX Reg. | bits 48–63 | bits 32–47 | bits 16–31 | bits 0–15 |
|---|---|---|---|---|
| mmx0 | difN[i] | difN[i] | difN[i] | difN[i] |
| mmx1 | subB[i] | subB[i] | subB[i] | subB[i] |
| mmx2 | subC[i] | subC[i] | subC[i] | subC[i] |
| mmx3 | grdfN[i] | grdfN[i] | grdfN[i] | grdfN[i] |
| mmx4 | <don't care> | entry at locP0[Y] + OffPtB[0] | entry at locP0[M] + OffPtB[0] | entry at locP0[C] + OffPtB[0] |
| mmx5 | <don't care> | entry at locP0[Y] + OffPtB[i] | entry at locP0[M] + OfPtB[i] | entry at locP0[C] + OffPtB[i] |
| mmx6 | <don't care> | entry at locP0[Y] + OffPtC[i] | entry at locP0[M] + OffPtC[i] | entry at locP0[C] + OffPtC[i] |
| mmx7 | <don't care> | entry at locP0[Y] | entry at locP0[M] | entry at locP0[C] |

Setting in a case of a CMYK output color format are shown in Table VII.

TABLE VII

MMX register settings for output color format with CMYK color components.

| MMX Reg. | bits 48–63 | bits 32–47 | bits 16–31 | bits 0–15 |
|---|---|---|---|---|
| mmx0 | difN[i] | difN[i] | difN[i] | difN[i] |
| mmx1 | subB[i] | subB[i] | subB[i] | subB[i] |
| mmx2 | subC[i] | subC[i] | subC[i] | subC[i] |
| mmx3 | grdfN[i] | grdfN[i] | grdfN[i] | grdfN[i] |
| mmx4 | entry at locP0[K] | entry at locP0[Y] | entry at locP0[M] | entry at locP0[C] |
| mmx5 | + OffPtB[0] entry at locP0[K] | + OffPtB[0] entry at locP0[Y] | + OffPtB[0] entry at locP0[M] | + OffPtB[0] entry at locP0[C] |
| mmx6 | + OffPtB[i] entry at locP0[K] | + OffPtB[i] entry at locP0[Y] | + OffPtB[i] entry at locP0[M] | + OffPtB[i] entry at locP0[C] |
| mmx7 | + OffPtC[i] entry at locP0[K] | + OffPtC[i] entry at locP0[Y] | + OffPtC[i] entry at locP0[M] | + OffPtC[i] entry at locP0[C] |

The MMX multiply word command is executed to multiply the following pairs of registers; mmx0×mmx4, mmx1×mmx5, mmx2×mmx6, and mmx3×mmx7. The resulting words are converted into bytes, added together, and shifted right four bits (i.e., divided by 16, the step size for input color components). The resulting bytes are the output color component values. Of course, modifications to the above operations are necessary if the step size is different or if a different tetrahedral interpolation method is used.

Preferably, steps S905 through S911 are each performed by a fixed set of assembler instructions, all of which are executed regardless of the input color component value values. As a result, the steps can be interleaved to avoid redundant instructions and to take advantage of pipelining and multiple instructions and cycle capabilities of the processor.

In step S912, it is determined if all of the pixels of the input image have been interpolated. If not, flow returns to step S902, and the next pixel is processed.

While the invention is described above with respect to what is currently considered its preferred embodiments, it is to be understood that the invention is not limited to that described above. To the contrary, the invention is intended to cover various modifications and equivalent arrangements included within the spirit and scope of the appended claims.

Appendix A

```
//edx = ecx = difX, esi = difY, ebx = difZ
/*   subC[6] = subB[5] = (difX − difY);
     subC[4] = subB[2] = (difX − difZ);
     subC[3] = subB[6] = (difY − difZ):
     subC[2] = subB[1] = (difY − difX);
     subC[5] = subB[3] = (difZ − difX);
     subC[1] = subB[4] = (difZ − difY);
*/
mov dword ptr [f0], edi
sub edx, esi                          //edx=difX−difY
setae a1                              //a1=1 if x≧y, 0
if x<y
mov dword ptr subBC[28+6*4], edx      //edx=difX−difY
sub esi, ebx                          //esi=difY−difZ
mov edi, eax
mov dword ptr sub3C[5*4], edx
setae a1                              //a1=1 y≧z, 0
if y<z
neg edx                               //edx=difY−difX
shl edi, 2
add a1, a1
mov dword ptr subBC[28+3*4], esi      //esi=difY−difZ
or edi, eax
mov dword ptr subBC[6*4], esi
sub ebx, ecx                          //edi=difZ−difX
mov dword ptr subBC[28+2*4], edx
seta a1                               //a1=1 if
z>x, 0 if z≦x
//construct a structure index (1−6) based on
relationship //between difX, difY and difZ
//ecx=difX, eax=difY, ebx=difZ
mov dword ptr subBC[1*4], edx
mov edx, eax
mov dword ptr subBC[28+5*4], ebx
or edx, edi                           // edx=structure
//                                    (or case) index
```

What is claimed is:

1. A method for obtaining an interpolated color output value corresponding to a color input value based on a color look-up table which stores color output values of each vertex of a cubic grid of color input values, the method comprising the steps of:

for at least one vertex of at least one cube of a cubic grid, determining a distance of an input color from the at least one vertex, the distance comprising plural component distances each of which corresponds to a component value of the input color;

calculating plural weights corresponding to the at least one cube of the cubic grid and at least one tetrahedron into which the at least one cube is dissected, the plural weights being calculated based on the distance of the input color from the at least one vertex of the at least one cube;

storing the calculated weights in a temporary look-up table accessible by an index;

executing a block of code, wherein instead of using conditional branch instructions conditioned on a comparison of the plural component values of the input color to determine interpolating weights, the block of code using therein the component distances to calculate the index to the look-up table of weights; and applying weights accessed at the indexed location of the temporary look-up table to color output values of the color look-up table, the weights being applied to the color output values at vertices of a tetrahedron identified by the index so as to obtain an interpolated output color corresponding to the input color.

2. A method according to claim 1, wherein the block of code also calculates the plural weights by arithmetic operations.

3. A method according to claim 2, wherein the arithmetic operations include subtraction commands that set a condition code.

4. A method according to claim 3, wherein the block of code uses the condition code to build the index.

5. A method according to claim 4, wherein the plural weights and the index are calculated coextensively.

6. A method according to claim 1, wherein the block of code calculates the index using bit shift commands.

7. A method according to claim 1, wherein the block of code calculates the index using bit masking commands.

8. A method according to claim 1, wherein the steps of determining a distance, calculating the plural weights, storing the calculated weights, executing the block of code, and applying the weights are repeated for each pixel of an input image.

9. An apparatus for obtaining an interpolated color output value corresponding to a color input value based on a color look-up table which stores color output values of each vertex of a cubic grid of color input values, comprising:

a memory including a region for storing the color look-up table, a region for storing a temporary look-up table, and a region for storing executable process steps; and a processor for executing the executable process steps;

wherein the executable process steps include steps of: (a) for at least one vertex of at least one cube of a cubic grid, determining a distance of an input color from the at least one vertex, the distance comprising plural component distances each of which corresponds to a component value of the input color, (b) calculating plural weights corresponding to the at least one cube of the cubic grid and at least one tetrahedron into which the at least one cube is dissected, the plural weights being calculated based on the distance of the input color from the at least one vertex of the at least one cube, (c) storing the calculated weights in the temporary look-up table accessible by an index, (d) executing a block of code, wherein instead of using conditional branch instructions conditioned on a comparison of the plural component values of the input color to determine interpolating weights, the block of code using therein the component distances to calculate the index to the look-up table of weights, and (e) applying weights, accessed at the indexed location of the temporary look-up table to color output values of the color look-up table, the weights being applied to the color output values at vertices of a tetrahedron identified by the index so as to obtain an interpolated output color corresponding to the input color.

10. An apparatus according to claim 9, wherein the block of code also calculates the plural weights by arithmetic operations.

11. An apparatus according to claim 10, wherein the arithmetic operations include subtraction commands that set a condition code.

12. An apparatus according to claim 11, wherein the block of code uses the condition code to build the index.

13. An apparatus according to claim 12, wherein the plural weights and the index are calculated coextensively.

14. An apparatus according to claim 9, wherein the block of code calculates the index using bit shift commands.

15. An apparatus according to claim 9, wherein the block of code calculates the index using bit masking commands.

16. An apparatus according to claim 9, wherein the executable-process steps of determining a distance, calculating the plural weights, storing the calculated weights, executing the block of code, and applying the weights are repeated for each pixel of an input image.

17. Computer-executable process steps stored on a computer-readable medium, the computer executable process steps to obtain an interpolated color output value corresponding to a color input value based on a color look-up table which stores color output values of each vertex of a cubic grid of color input values, the computer-executable process steps comprising:

for at least one vertex of at least one cube of a cubic grid, code to determine a distance of an input color from the at least one vertex, the distance comprising plural component distances each of which corresponds to a component value of the input color;

code to calculate plural weights corresponding to the at least one cube of the cubic grid and at least one tetrahedron into which the at least one cube is dissected, the plural weights being calculated based on the distance of the input color from the at least one vertex of the at least one cube;

code to store the calculated weights in a temporary look-up table accessible by an index;

code to calculate the index to the look-up table of weights, wherein instead of using conditional branch instructions conditioned on a comparison of the plural component values of the input color to determine interpolating weights, the code using therein the component distances to calculate the index to the look-up table of weights; and code to apply weights accessed at the indexed location of the temporary look-up table to color output values of the color look-up table, the weights being applied to the color output values at vertices of a tetrahedron identified by the index so as to obtain an interpolated output color corresponding to the input color.

18. Computer-executable process steps according to claim 17, wherein the plural weights are calculated by arithmetic operations.

19. Computer-executable process steps according to claim 18, wherein the arithmetic operations include subtraction commands that set a condition code.

20. Computer-executable process steps according to claim 19, wherein the condition code is used to build the index.

21. Computer-executable process steps according to claim 20, wherein the plural weights and the index are calculated coextensively.

22. Computer-executable process steps according to claim 17, wherein the index is calculated using bit shift commands.

23. Computer-executable process steps according to claim 17, wherein the index is calculated using bit masking commands.

24. Computer-executable process steps according to claim 17, wherein the codes to determine a distance, calculate the plural weights, store the calculated weights, execute the block of code, and apply the weights are repeated for each pixel of an input image.

25. A computer-readable medium which stores computer-executable process steps, the computer-executable process steps to obtain an interpolated color output value corresponding to a color input value based on a color look-up table which stores color output values of each vertex of a cubic grid of color input values, the computer-executable process steps comprising:

a determining step to determine, for at least one vertex of at least one cube of a cubic grid, a distance of an input color from the at least one vertex, the distance comprising plural component distances each of which corresponds to a component value of the input color;

a calculating step to calculate plural weights corresponding to the at least one cube of the cubic grid and at least one tetrahedron into which the at least one cube is dissected, the plural weights being calculated based on the distance of the input color from the at least one vertex of the at least one cube;

a storing step to store the calculated weights in a temporary look-up table accessible by an index;

an executing step to execute a block of code, wherein instead of using conditional branch instructions conditioned on a comparison of the plural component values of the input color to determine interpolating weights, the block of code using therein the component distances to calculate the index to the look-up table of weights; and an applying step to apply weights accessed at the indexed location of the temporary look-up table to color output values of the color look-up table, the weights being applied to the color output values at vertices of a tetrahedron identified by the index so as to obtain an interpolated output color corresponding to the input color.

26. A computer-readable medium according to claim 25, wherein the block of code also calculates the plural weights by arithmetic operations.

27. A computer-readable medium according to claim 26, wherein the arithmetic operations include subtraction commands that set a condition code.

28. A computer-readable medium according to claim 27, wherein the block of code uses the condition code to build the index.

29. A computer-readable medium according to claim 28, wherein the plural weights and the index are calculated coextensively.

30. A computer-readable medium according to claim 25, wherein the block of code calculates the index using bit shift commands.

31. A computer-readable medium according to claim 25, wherein the block of code calculates the index using bit masking commands.

32. A computer-readable medium according to claim 25, wherein the executable-process steps of determining a distance, calculating the plural weights, storing the calculated weights, executing the block of code, and applying the weights are repeated for each pixel of an input image.

* * * * *